(12) United States Patent
Krishnamurthy (10) Patent No.: US 8,209,353 B2
(45) Date of Patent: Jun. 26, 2012

(54) STORING HIERARCHICAL DATA TO ENABLE PAGING

(75) Inventor: Sanjay Krishnamurthy, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 12/415,440

(22) Filed: Mar. 31, 2009

(65) Prior Publication Data

US 2010/0250611 A1  Sep. 30, 2010

(51) Int. Cl.
*G06F 17/30* (2006.01)
*G06F 3/048* (2006.01)

(52) U.S. Cl. ........................ 707/797; 715/785

(58) Field of Classification Search .............. 707/797; 715/785
See application file for complete search history.

(56) References Cited

U.S. PATENT DOCUMENTS

| | | | |
|---|---|---|---|
| 6,427,147 B1 * | 7/2002 | Marquis | 707/741 |
| 6,480,857 B1 * | 11/2002 | Chandler | 707/792 |
| 6,694,323 B2 * | 2/2004 | Bumbulis | 707/999.101 |
| 6,779,119 B1 | 8/2004 | Moshfeghi et al. | |
| 2003/0160815 A1 | 8/2003 | Muschetto | |
| 2004/0243553 A1 * | 12/2004 | Bailey | 707/3 |
| 2007/0006165 A1 | 1/2007 | Lam et al. | |
| 2007/0088764 A1 | 4/2007 | Yoon et al. | |
| 2009/0088204 A1 | 4/2009 | Culbert et al. | |
| 2009/0100384 A1 | 4/2009 | Louch | |
| 2009/0150814 A1 | 6/2009 | Eyer et al. | |

OTHER PUBLICATIONS

Eric N. Hanson, "Rule Condition Testing and Action Execution in Ariel", ACM SIGMOD, 1992, pp. 49-58.*
Torsten Grust et al., "Accelerating XPath Evaluation in Any RDBMS", Mar. 2004, ACM Transactions on Database Systems, vol. 29, No. 1, pp. 91-131.*
Leo Yuen & Chung Keung Poon, "Relational Index Support for XPath Axes", 2005, International XML Database Symposium, pp. 84-98.*
Martin F. O'Connor et al., "An Extended Preorder Index for Optimising XPath Expressions", 2005, International XML Database Symposium, pp. 114-128.*
Final Office Action dated Feb. 28, 2012 in U.S. Appl. No. 12/414,983, pp. 20.
Office Action dated Aug. 25, 2011 in U.S. Appl. No. 12/414,983, pp. 17.
Amendment dated Dec. 25, 2011 in U.S. Appl. No. 12/414,983, pp. 14.

* cited by examiner

*Primary Examiner* — Cheryl Lewis
*Assistant Examiner* — Scott A Waldron
(74) *Attorney, Agent, or Firm* — Silicon Valley Patent Group LLP; Omkar Suryadevara (57) ABSTRACT

A method and apparatus for performing a paging operation on a tree having a plurality of nodes is provided. A preorder number and a subtree size are maintained in a machine-readable medium for each of the plurality of nodes of the tree. The preorder number associated with a particular node of the tree identifies a position for the particular node in a depth-first search ordering of the plurality of nodes of the tree. The subtree size associated with a particular node of the tree identifies a count of all the nodes in a subtree rooted at the particular node. In response to receiving a request to perform a paging operation on the plurality of nodes of the tree, a set of nodes that satisfy the paging operation may be determined using the preorder number and the subtree size associated with each node of the tree.

20 Claims, 8 Drawing Sheets

DELETE NODE D

STORING HIERARCHICAL DATA TO ENABLE PAGING

RELATED APPLICATION DATA

This application is related to U.S. patent application Ser. No. 12/414,983, published as US Pre-Grant Publication No. 2010/0251126 A1 on Sep. 30, 2010, entitled "Analyzing User Behavior to Enhance Data Display," filed concurrently herewith, invented by Sanjay Krishnamurthy, the contents of which are herein incorporated by reference for all purposes as if fully set forth herein.

FIELD OF THE INVENTION

The present invention generally relates to performing a paging operation on a tree represented by hierarchal data.

BACKGROUND OF THE INVENTION

A tree structure (or simply a "tree") is an acyclic connected graph of nodes where each node has zero or more child nodes and at most one parent node. The top-level node of a tree is called the root node. Each node of the tree may be associated with a data set. A tree may be used to illustrate the hierarchical relationships between the data sets associated with the nodes of the tree. As a result, data that represents a tree structure, or a portion thereof, or is otherwise arranged in a hierarchical manner is referred to herein as hierarchical data.

Trees may be useful in many contexts involving hierarchical data. For example, XML is a popular specification for structuring data that is widely used by many applications. An XML document, which is a set of data that conforms to the XML specification, is arranged as a tree structure. Thus, any application that manipulates an XML document or displays an XML document to a user interacts with nodes of a tree.

Many applications visually depict hierarchical data to a user by displaying the hierarchical data as a tree. As some trees may comprise a large number of nodes, many user interfaces allow a user to perform a paging operation or a scrolling operation on a displayed portion of the tree to display a different portion of the tree. For example, some trees may comprise thousands to hundreds of thousands of nodes, and therefore, it may not be possible for all the nodes of the tree to be simultaneously depicted on a screen at once. By enabling a user to page or scroll the tree being displayed to the user, the user may view portions of the tree that are not currently displayed to the user.

A problem with performing paging or scrolling operations on a tree is that the operations require a large amount of memory. Currently, when a user issues a request to an application to perform a paging operation on a tree, the application must traverse (or "walk") the tree in order to determine which nodes of the tree should be displayed to the user on the requested page. To illustrate, if a user issues a request to perform a paging operation to update the portion of the tree that is displayed to the next page, then the application must identify those nodes of the tree which are on the next page. The application does this by walking the tree to examine each node to determine if it should be displayed on the requested page. For example, the application may identify all the child nodes of the root nodes, determine whether those child nodes are displayed on the requested page, then identify all the child nodes of the second level of the tree to determine whether those nodes are displayed on the requested page, and so on, until all the nodes of the tree which are on the requested page are identified.

Consequently, to walk a tree comprising a large number of nodes, a large amount of memory and computational resources are required, as each node of the tree that is examined, or "walked," is typically loaded into memory. Indeed, the larger the tree, the more memory and computational resources are required to perform a paging operation. This is undesirable, as an increase in the consumption of memory and computational resources of a computerized system tends to decrease performance of the computerized system. Browsing large trees (such as a tree having more than 5000 nodes) should be perceived as being fast and time and computational resources required to browse the tree should be independent of the number of nodes in the tree; however, no approach for doing so is currently known in the art.

SUMMARY OF EMBODIMENTS OF THE INVENTION

Techniques are provided for storing hierarchal data in a manner that enables paging or scrolling operations to be performed on a tree represented by the hierarchical data. In an embodiment, a preorder number and a subtree size are maintained in a machine-readable medium for each of a plurality of nodes of a tree represented by hierarchical data. The preorder number associated with a particular node of the tree identifies a position of the particular node in a depth-first search ordering of the plurality of nodes of the tree. The subtree size associated with a particular node of the tree identifies a count of all the nodes in a subtree rooted at the particular node.

In an embodiment, a paging operation may be performed using the preorder number and the subtree size associated with each node of the tree. Approaches are discussed for updating the preorder number and subtree size associated with each node of a tree in response to the performance of edit operations performed on nodes of the tree.

Embodiments of the invention may perform edit operations (such as an add operation or a delete operation) to nodes of a tree in a batch fashion. The performance of these edit operations may be optimized by analyzing the batched edit operations prior to their performance. To illustrate, prior to their performance, edit operation that have been requested to be performed on a tree may be arranged in a sequence. The sequence may be based on the preorder number of the node on which each edit operation is to be performed.

By examining the order of add operations and delete operations in the sequence of edit operations, the preorder number of nodes of the tree may be updated in a single update operation to reflect the performance of multiple add operations or multiple delete operations. Further, if the number of number of add operations, in the sequence of edit operations, that are to be performed on nodes having a preorder number less than the preorder number of a particular node of the tree is equal to the number of delete operations, in the sequence of edit operations, that are to be performed on nodes having a preorder number less than the preorder number of the particular node, then the preorder number of the particular node does not need to be updated, since the position of the particular node in the depth-first search ordering of the trees of the node will not change. In this way, many update operations to the preorder number of nodes of the tree may be avoided, thereby saving memory and computational resources.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

A method and apparatus for storing hierarchal data in a manner that enables paging or scrolling operations to be performed on a tree represented by the hierarchical data is described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Paging And Scrolling Operations

Embodiments of the invention enable computerized entities to perform paging and scrolling operations on a tree, regardless of the size of the tree, in a fast and efficient manner. In this way, the amount of memory and computational resources required to page or scroll a tree does not increase with an increase in the size of the tree.

As used herein, a paging operation is an operation, performed on a tree of nodes, to identify a sequence of consecutive nodes of the tree. Typically, a paging operation is performed to update the display of a user interface to show a different portion of a tree of nodes than what is currently displayed by the user interface. A request to perform a paging operation identifies the particular portion, or "page," of the tree. The result of performing a paging operation is the identification of the set of consecutive nodes of the tree that are associated with the page identified by the request.

For example, assume that a tree comprises one hundred nodes, and the nodes of the tree are displayed to a user on a user interface which displays ten nodes at a time. Thus, all the nodes of the tree may be viewed across ten different pages. By default, the user interface may initially display the first ten nodes of the tree. A user who wishes to view the nodes of the tree on page seven may issue a request to perform a paging operation that identifies page seven. As a result of performing the paging operation, the nodes of the tree that are to be displayed on page seven are identified so that they can be displayed by the user interface.

It is noted that in most contexts, a paging operation is performed to update the visual display of a user interface that is displaying a portion of a tree of nodes. However, a paging operation does not necessary require the display of data, as a paging operation may be performed in contexts where nodes of the tree are not displayed. As a result, certain embodiments of the invention may implement a paging operation such that the performance of the paging operation updates the display of a user interface to depict the sequence of consecutive nodes of the tree associated with the desired page, while other embodiments of the invention may implement a paging operation such that the performance of the paging operation identifies a sequence of consecutive nodes of the tree without depicting the identified nodes on a display.

A scrolling operation is similar to a paging operation, in that a scrolling operation is also performed on a tree of nodes to identify a sequence of consecutive nodes of the tree. However, rather than identifying the desired sequence of consecutive nodes by identifying a particular page, a user initiating a scrolling operation identifies the desired sequence of consecutive nodes through the user's manipulation of a scrollbar.

Figure 1:
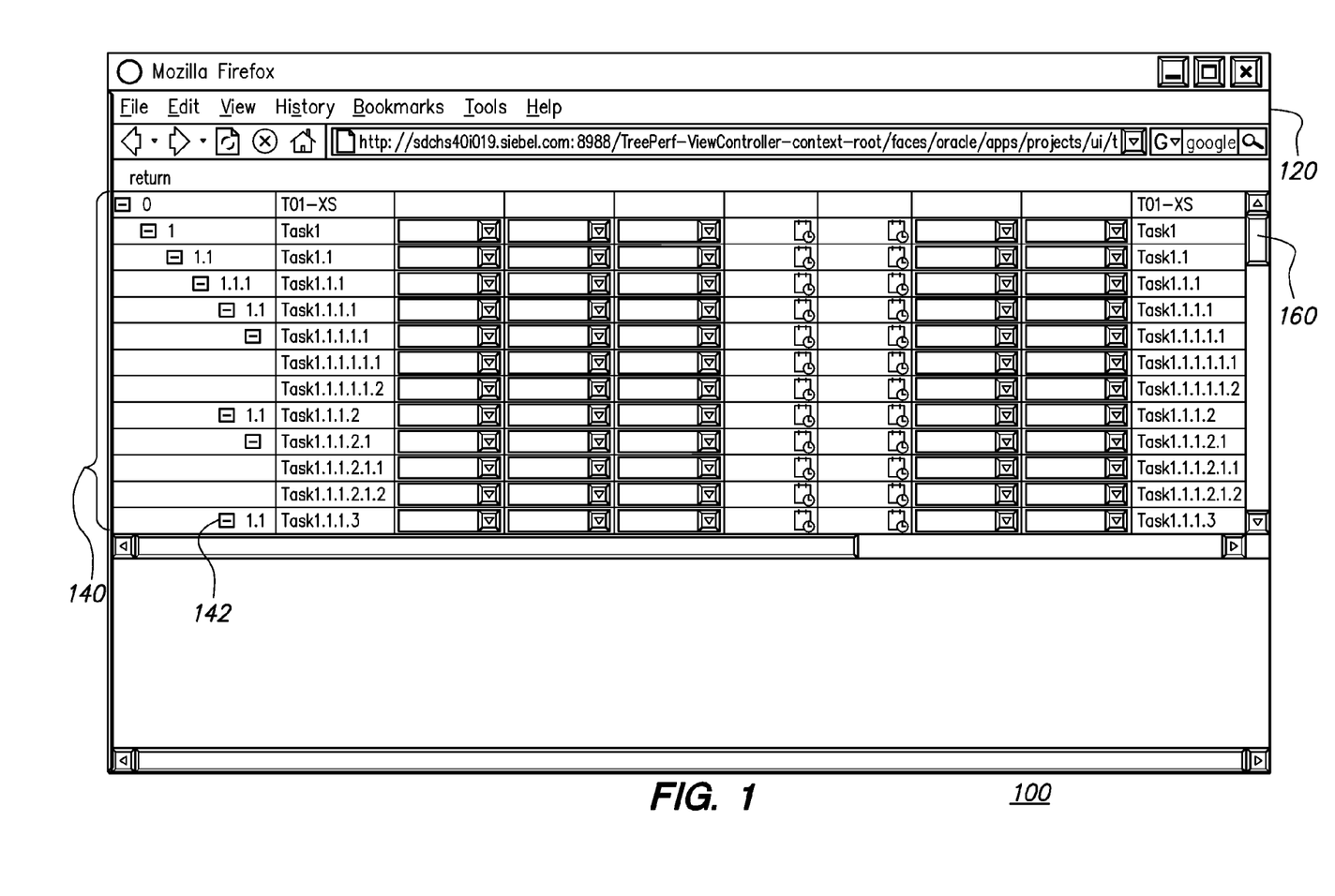
FIG. 1 is an illustration of a user interface depicting a tree of nodes which may be paged according to an embodiment of the invention.

FIG. 1 is an illustration 100 of user interface 120 depicting a tree of nodes 140 which may be scrolled using a scrollbar 160 according to an embodiment of the invention. Assume the number of nodes in tree of nodes 140 is too big to depict all of the nodes of tree of nodes 140 on user interface 120 at the same time. By moving scrollbar 160, the user may adjust which portion of tree of nodes 140 is displayed on user interface 120. For example, by moving scrollbar 160 down, the user causes user interface 120 to depict additional nodes, of tree of nodes 140, which occur after node 142 but which are not currently depicted by user interface 120.

Embodiments of the invention may implement a scrolling operation in a variety of different ways. In one embodiment, a scrolling operation may be implemented as a specialized form of a paging operation. By moving the scrollbar, the user may issue a paging operation that updates the visual appearance of the user interface displaying a portion of the tree to depict another portion of the tree associated with a page indicated by the movement of the scrollbar. In such an embodiment, the user interface is updated on a page by page basis. Thus, if a page depicts five nodes of the tree at a time, then the smallest increment which the tree may be scrolled is five nodes because that is how many nodes are displayed per page.

In another embodiment, a scrolling operation may be implemented such that a user interface may be updated one node at a time. In such an embodiment, the user interface may store, in memory, a set of nodes (the "cached nodes") that are the next in sequence to be displayed. When the user uses the scrollbar to update the display of the user interface, then the user interface may update its display, one node at a time, using the cached nodes. When the number of nodes in the cached nodes needs to be replenished, additional nodes may be retrieved from storage by performing a paging operation to obtain another page of nodes.

Having illustrated how certain embodiments perform paging and scrolling operations, additional details will now be presented regarding preorder numbers and subtree sizes, which are used when performing paging and scrolling operations according to embodiments of the invention.

Preorder Numbers And Subtree Sizes

Embodiments of the invention perform paging and scrolling operations using information that describes characteristics of each node of a tree. This information includes a preorder number and a subtree size for each node of the tree. In an embodiment, a preorder number and a subtree size are maintained in a machine-readable medium for each of a plurality of nodes of a tree represented by hierarchical data.

The preorder number associated with a particular node of the tree identifies a position for the particular node in a depth-first search ordering of the plurality of nodes of the tree. The subtree size associated with a particular node of the tree identifies a count of all the nodes in a subtree (the subtree includes the particular node) rooted at the particular node.

Figure 2:
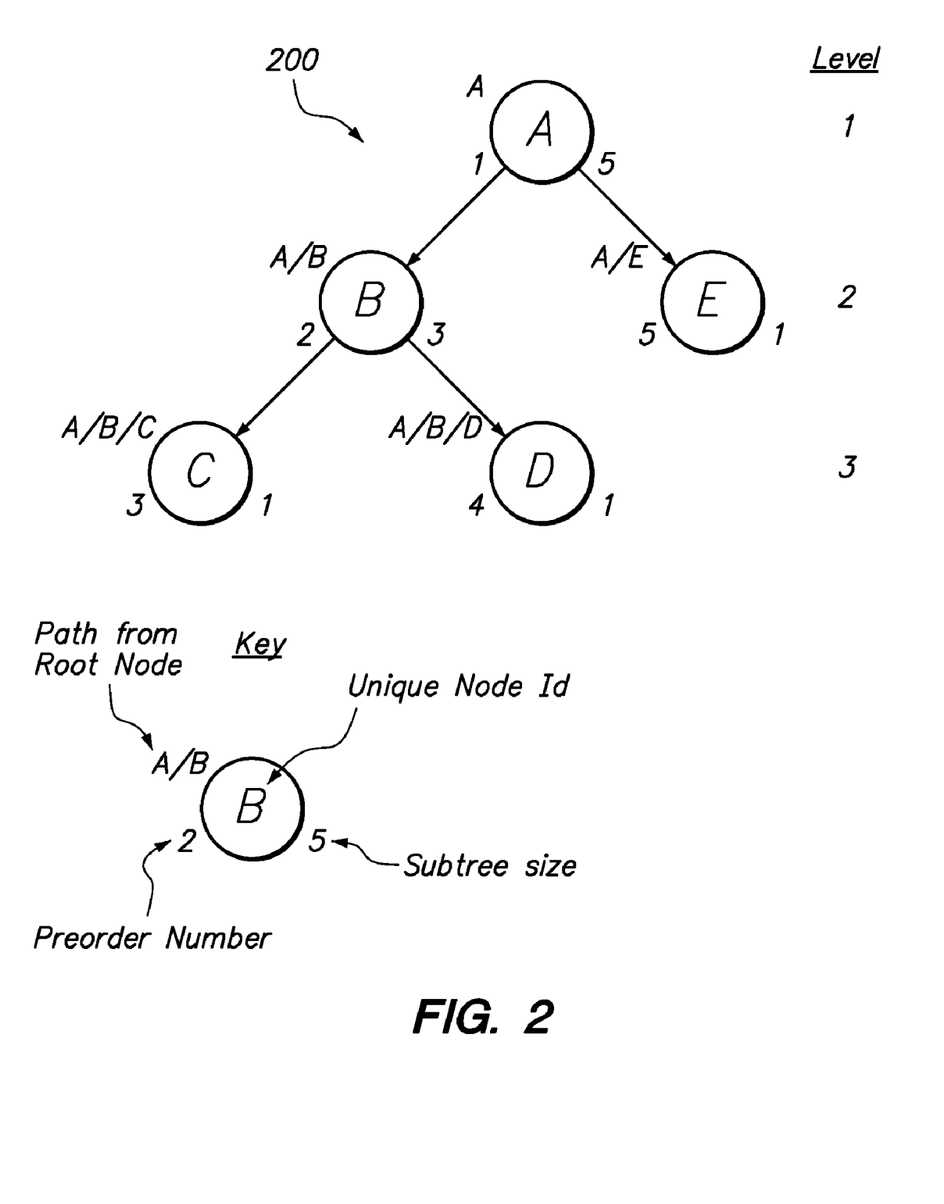
FIG. 2 is a diagram of an exemplary tree that illustrates preorder numbers and subtree sizes according to an embodiment of the invention.

To further illustrate preorder numbers subtree sizes, consider FIG. 2, which is a diagram of an exemplary tree that illustrates preorder numbers and subtree sizes according to an embodiment of the invention. As shown by FIG. 2, each node of the tree has a unique node identifier (or "node id"), which may be any set of characters that may be used to uniquely identify a node of the tree.

A depth first search is an algorithm for traversing a tree wherein one starts at the root node and explores the first unexplored child node before backtracking. If the nodes of the tree are arranged in the order of a depth first search, then the order of node ids in this sequence would be A, B, C, D, and E. The preorder number for each node of the tree is the position of the node in a depth first search ordering. Therefore, the preorder number of node A is 1, the preorder number of node B is 2, the preorder number of node C is 3, the preorder number of node D is 4, and the preorder number of node E is 5.

FIG. 2 also illustrates the subtree size of each node of the tree. Nodes C, D, and E are leaf nodes, as each has no child nodes. Therefore, the subtree size of node C is 1 because a subtree of size 1 (consisting of just node C) is rooted at node C, the subtree size of node D is 1 because a subtree of size 1 (consisting of just node D) is rooted at node D, and the subtree size of node E is 1 because a subtree of size 1 (consisting of just node E) is rooted at node E. The subtree size of node B is 3 because a subtree of size 3 (the subtree consisting of node B, node C, and node D) is rooted at node B. The subtree size of node A is 5 because a subtree of size 5 (the subtree consisting of node A, node B, node C, node D, and node E) is rooted at node A.

Embodiments of the invention may store additional information about each node of a tree besides a preorder number and the subtree size. In an embodiment, the information stored about each node of a tree may include the path from the root node to each node of the tree. As illustrated in FIG. 2, a path from the root node may be maintained for each node of the tree. In the tree of FIG. 2, the root node is node A. Therefore, the path from the root node for node D is A/B/D because node B is the parent node of node D, and node A is the parent node of node B.

In an embodiment, the information stored about each node of a tree may include a level associated with each node. A level is an indication of how far away a particular node is from the root node. In the embodiment illustrated in FIG. 2, the root node A has a level of 1. All child nodes have a level 1 greater than the level associated with their parent node. Thus, all child nodes of the root node have a level of 2, e.g., the level of nodes B and E is 2. The level of nodes C and D is 3 because each of their parent nodes has a level of 2.

Systems according to embodiments of the invention use the preorder number and the subtrees size associated with each node of a tree when performing paging and scrolling operations on the tree. Prior to discussing in further detail how systems according to embodiments of the invention perform paging and scrolling operations using the preorder number and subtree size associated with each node of the tree, additional details will now be presenting about the architecture of illustrative systems according to embodiments of the invention.

Architecture Overview

Figure 3:
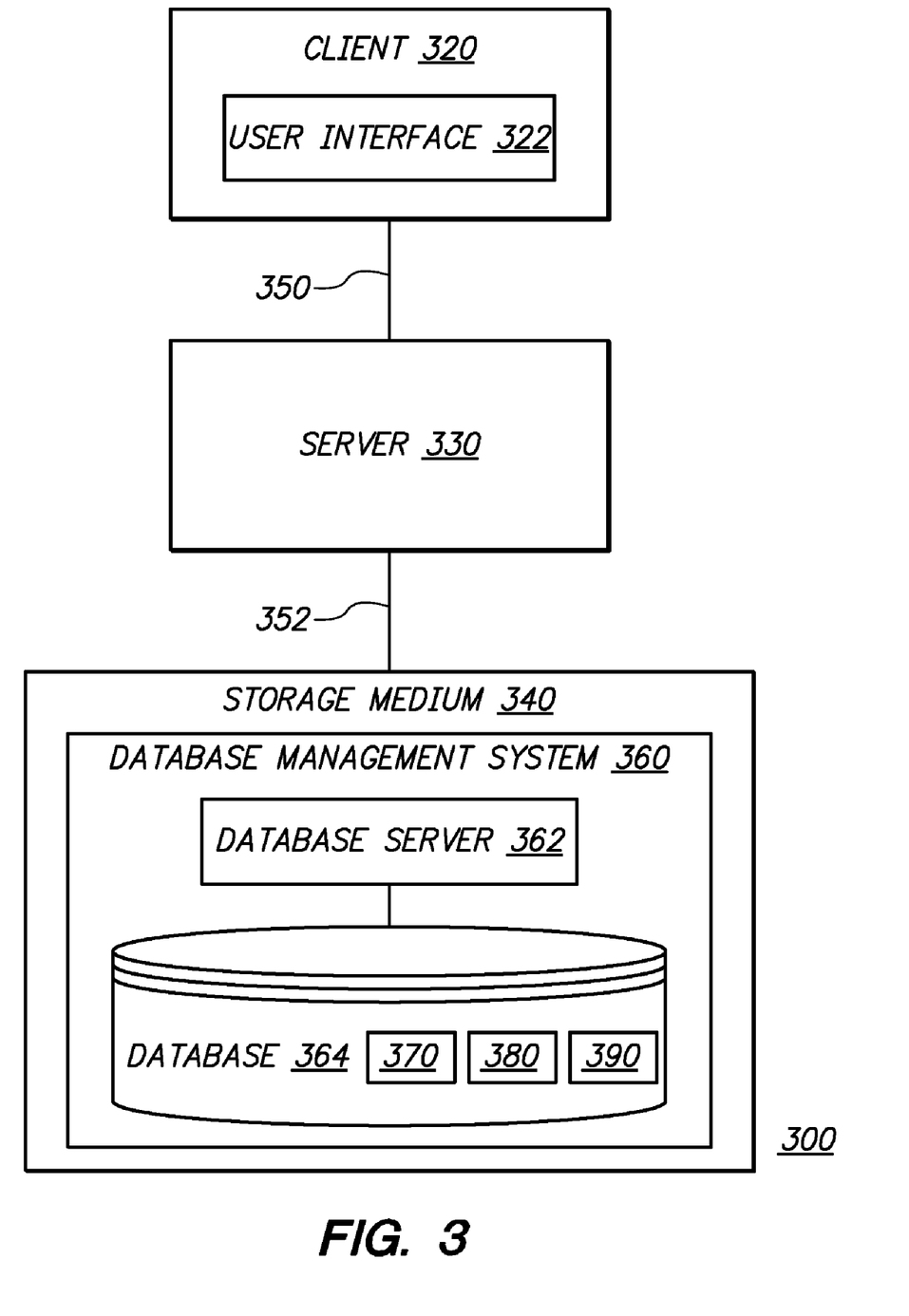
FIG. 3 is a block diagram of a system according to an embodiment of the invention.

FIG. 3 is a block diagram of a system 300 according to an embodiment of the invention. System 300 may be used to store hierarchal data in a manner that enables paging or scrolling operations to be performed on a tree represented by the hierarchical data in a manner where the size of the tree does not impact the performance of the paging or scrolling operation. System 300 includes client 320, server 330, storage medium 340, and communications links 350 and 352. Each of these components shall be discussed in more detail below.

Client 320, as broadly used herein, represents any hardware or software entity capable of presenting a user interface, such as user interface 322, to a user. Non-limiting, illustrative examples of client 320 include a web browser, a cell phone, a personal digital assistance (PDA), a wireless device, or a software application. While only one client is depicted in the embodiment shown in FIG. 3 for ease of explanation, other embodiments may employ a plurality of clients.

User interface 322, as broadly used herein, represents any graphical element that is capable of depicting a tree of nodes to a user. User interface 322 may be incorporated as part of a display, such as a web page. User interface 322 is capable of being configured by a user to display data in one or more states. For example, a user may use user interface 322 to issue a request to perform a paging operation or a scrolling operation upon the tree of nodes displayed by user interface 322.

User interface 322 may be displayed on multiple clients at the same time and each client depicting user interface 322 may render user interface 322 in a different state. For example, if user interface 322 is incorporated as part of a web page, then multiple web browsers may simultaneously depict user interface 322. Each user of a web browser is free to interact and configure user interface 322 in any way they see fit.

Server 330 may be implemented by any medium or mechanism that is capable of (a) responding to requests from client 320 and (b) storing data to and retrieving data from storage medium 340. Server 330 may be used to process requests, received from client 320, to perform paging or scrolling operations on a tree displayed on client 320. In processing requests from client 320, server 330 may retrieve data from or store data in storage medium 340.

While server 330 is depicted as a single entity in FIG. 3, embodiments of the invention may implement server 330 using two or more computerized entities working together. For example, in certain embodiments, server 330 may be implemented as a web server and an application server and/or an authentication server working together to perform the functions described herein attributable to server 330.

Storage medium 340 may be implemented by any medium or mechanism that is capable of storing digital data. Non-limiting, illustrative examples of storage medium 340 include a database management system, a file server, and any volatile or non-volatile storage medium for digital data. For example, in the embodiment depicted in FIG. 3, storage medium 340 is implemented using database management system 360, which includes one or more database servers 362 and one or more databases 364.

Communications link 350 may be implemented by any medium or mechanism that provides for the exchange of data between client 320 and server 330. Communications link 352 may be implemented by any medium or mechanism that provides for the exchange of data between server 330 and storage medium 340. Non-limiting, illustrative examples of communications links 350 and 352 include, without limitation, a network such as a Local Area Network (LAN), Wide Area Network (WAN), Ethernet or the Internet, one or more terrestrial, satellite or wireless links, and serial or parallel printer cables.

Storage medium 340 may store a variety of data. In an embodiment, storage medium 340 stores hierarchical data 370. Hierarchical data 370 is digital data that (a) represents a tree structure, or a portion thereof, or (b) is otherwise arranged in a hierarchical manner. For example, in an embodiment, hierarchical data 370 may represent the tree depicted in FIG. 2 by describing each node of the tree as well as the describing all the parent/child relationships between nodes of the tree.

In the embodiment depicted in FIG. 3, storage medium 340 also stores preorder data 380. Preorder data 380 is data that describes, for each node of the tree of nodes described by hierarchical data 370, a preorder number. For example, if the tree depicted in FIG. 2 was described by hierarchical data 370, then preorder data 380 would identify the preorder number associated with each node of the tree of FIG. 2.

In the embodiment depicted in FIG. 3, storage medium 340 also stores subtree size data 390. Subtree size data 390 is data that describes a size of a subtree rooted at each node of the tree of nodes described by hierarchical data 370. For example, if the tree depicted in FIG. 2 was described by hierarchical data 370, then subtree size data 390 would identify the subtree size associated with each node of the tree of FIG. 2.

To facilitate understanding of embodiments of the invention, FIG. 3 depicts hierarchical data 370, preorder data 380, and subtree size data 390 as being separate. However, other embodiments of the invention may combine one or more of hierarchical data 370, preorder data 380, and subtree size data 390 such that the same data qualifies as one or more of hierarchical data 370, preorder data 380, and subtree size data 390. Thus, there is no requirement that hierarchical data 370, preorder data 380, and subtree size data 390 be stored separately, and many embodiments may store one or more of hierarchical data 370, preorder data 380, and subtree size data 390 together.

Having described an illustrative system 300 according to an embodiment of the invention, the processing of performing a paging operation according to an embodiment of the invention shall now be discussed.

Performing A Paging Operation

Figure 4:
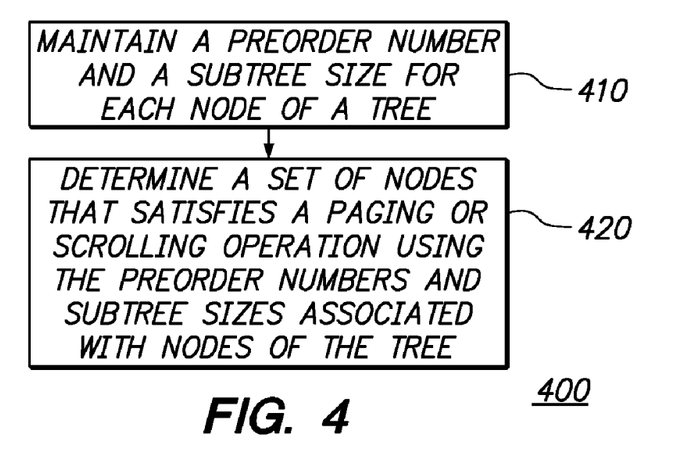
FIG. 4 is a flowchart illustrating the steps of performing a paging operation according to an embodiment of the invention.

FIG. 4 is a flowchart illustrating the steps of performing a paging operation according to an embodiment of the invention. In step 410, a preorder number and a subtree size are maintained for each node of a tree. In an embodiment, server 330 is responsible for maintaining, for each node of a tree, a preorder number and a subtree size. Server 330 may initially determine, for each node of the tree, a preorder number and a subtree size, and may subsequently store, in storage medium 340, (a) preorder data 380 that identifies the preorder number associated with each node of the tree and (b) subtree size data 390 that identifies the subtree size associated with each node of the tree. Thereafter, any time an edit operation is performed to the tree, server 330 may update one or more of preorder data 380 and subtree size data 390 to reflect any changes made to the preorder number or subtree size associated with each node of the tree. The process of updating the preorder data 380 and subtree size data 390 to reflect the performance of any edit operations shall be discussed in further detail below in the section entitled "Maintaining Preorder Data and Substree Size Data During the Performance of Edit Operations." After a preorder number and a subtree size number are established and maintained for each node of a tree, step 420 may be performed as described below.

In step 420, in response to server 330 receiving, from client 320, a request to perform a paging operation on a tree, server 330 determines a set of nodes that satisfy the paging operation using the preorder number and the subtree size associated with each node of the tree. A user may use client 320 to issue the request to perform a paging operation to server 330. The user may be viewing a portion of the tree to be paged in user interface 322 displayed by client 320 prior to instructing client 320 to issue the request to perform the paging operation to server 330.

In an embodiment, the request to perform a paging operation identifies (a) the tree to be paged, (b) the particular page to which the tree is requested to be paged, and (c) the page size. The page size is the number of nodes of a tree which are to be displayed on each page. In another embodiment, server 330 stores information that identifies the page size which user interface 322 can support, and so it is not necessary for a request to perform a paging operation issued by client 320 to identify the page size. Also, in another embodiment, server 330 may store information that identifies the tree that user interface 322 is displaying; consequently, it would not be necessary for a request to perform a paging operation to identify the tree to be paged.

In response to receiving the request to perform the paging operation, server 330 may determine the set of nodes that satisfy the paging operation by identifying the set of nodes of the identified tree which have a preorder number having a value ranging from:

$$p*(n-1)+1 \text{ to } p*(n-1)+p$$

where n represents the particular page to which the tree is requested to be paged, and p represents the page size. The above calculation shall be referred to herein as the Page Composition Calculation.

As an example, consider tree 200 illustrated by FIG. 2. Assume that user interface 322 of client 320 can support displaying a page size of three nodes (and so p=3). Further assume that a user instructs client 320 to issue a paging operation to page tree 200 to page two (and so n=2). Server 330 may determine which nodes of tree 200 should be displayed on page two by using the Page Composition Calculation to identify the nodes of tree 200 which have a preorder number having a value ranging from 3*(2−1)+1 to 3*(2−1)+ 3, or 4 to 6. Thus, server 330 may identify that any nodes of tree 200 having a preorder number of 4 to 6 is responsive to the paging operation. Tree 200 has two nodes that have a preorder number between 4 and 6, namely node D (having a preorder number of 4) and node E (having a preorder number of 5). Thus, server 330 may respond to the request to perform a paging operation sent from client 320 by communicating to client 320 any data that client 320 needs to render nodes D and E of tree 200 on the requested page. Note that while three nodes could have been displayed on user interface 322 in this example (because the page size is three), only two nodes satisfied the paging operation because, since node E of tree 200 has the highest preorder number of any node of tree 200, there are no more nodes to depict after node E.

To illustrate another example, assume that user interface 322 may depict fifty nodes of a particular tree having 10,000 nodes on a page (p=50), and the client 320 issues, to server 330, a request to perform a paging operation to page to page thirty (n=30). Server 330 may determine which nodes of the tree should be displayed on page thirty by using the Page Composition Calculation to identify the nodes of the tree which have a preorder number having a value ranging from 50*(30−1)+1 to 50*(30−1)+50, or 1451 to 1500. Thus, server 330 may identify that any nodes of the tree having a preorder number of 1451 to 1500 is responsive to the paging operation.

In an embodiment, server 330 may calculate the total number of pages on which nodes of a tree should be displayed by dividing the subtree size of the root node of the tree by the page size. As the number of nodes of a tree may change in number as edit operations are performed to the tree, the number of pages upon which all the nodes of the tree can be displayed may change over time. Thus, server 330 may have need to dynamically determine the total number of pages upon which nodes of a tree should be displayed in responding to certain requests from client 320 involving the display of the nodes of the tree on user interface 322.

Determining the total number of pages on which nodes of a tree should be displayed may be useful in ensuring the size and movement of the scrollbar is proportional to the total number of pages on which nodes of a tree are displayed. In an embodiment, server 330 may periodically inform client 320 about the total number of pages on which nodes of a tree should be displayed so that client 320 may ensure the size and movement of the scrollbar is proportional to the total number of pages on which nodes of a tree are displayed. In another embodiment, server 330 need not periodically inform client 320 about the total number of pages on which nodes of a tree should be displayed, because server 330 is responsible for composing the visual appearance of a display rendered on user interface 322. In such an embodiment, upon server 330 determining the total number of pages on which nodes of a tree should be displayed, server 330 may make an adjustment to a display that is intended to be depicted on user interface 322 to ensure the size and movement of the scrollbar is proportional to the total number of pages on which nodes of a tree are displayed.

Having described how a paging operation is performed by an embodiment of the invention, additional details will now be provided on how the preorder number and the subtree size for each node of the tree are maintained while edit operations are performed to the tree.

Figure 5:
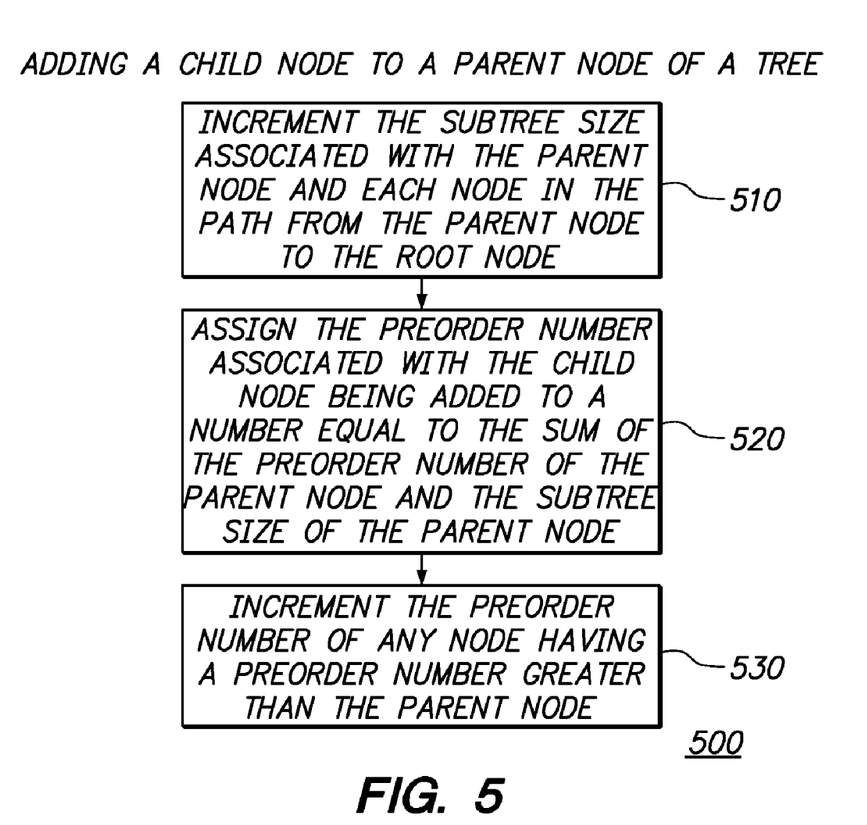
FIG. 5 is a flowchart illustrating the steps of adding a child node to a parent node of a tree according to an embodiment of the invention.

Maintaining Preorder Data And Substree Size Data During The Performance Of Edit Operations FIG. 5 is a flowchart illustrating the steps of adding a child node to a parent node of a tree according to an embodiment of the invention. In an embodiment, the steps of FIG. 5 maybe performed by server 330. The steps of FIG. 5 shall be described below with reference to FIG. 6, which is a diagram of an exemplary tree 600 that illustrates adding a child node F to a parent node C of the tree depicted in FIG. 2 according to an embodiment of the invention.

In step 510, the subtree size associated with the parent node and each node in the path from the parent node to the root node is incremented. In an embodiment, server 330 may perform step 330 by updating subtree size data 390 so that the subtree size associated with the parent node of the child node being added and each node in the path from the parent node to the root node is increased by a value of one.

Figure 6:
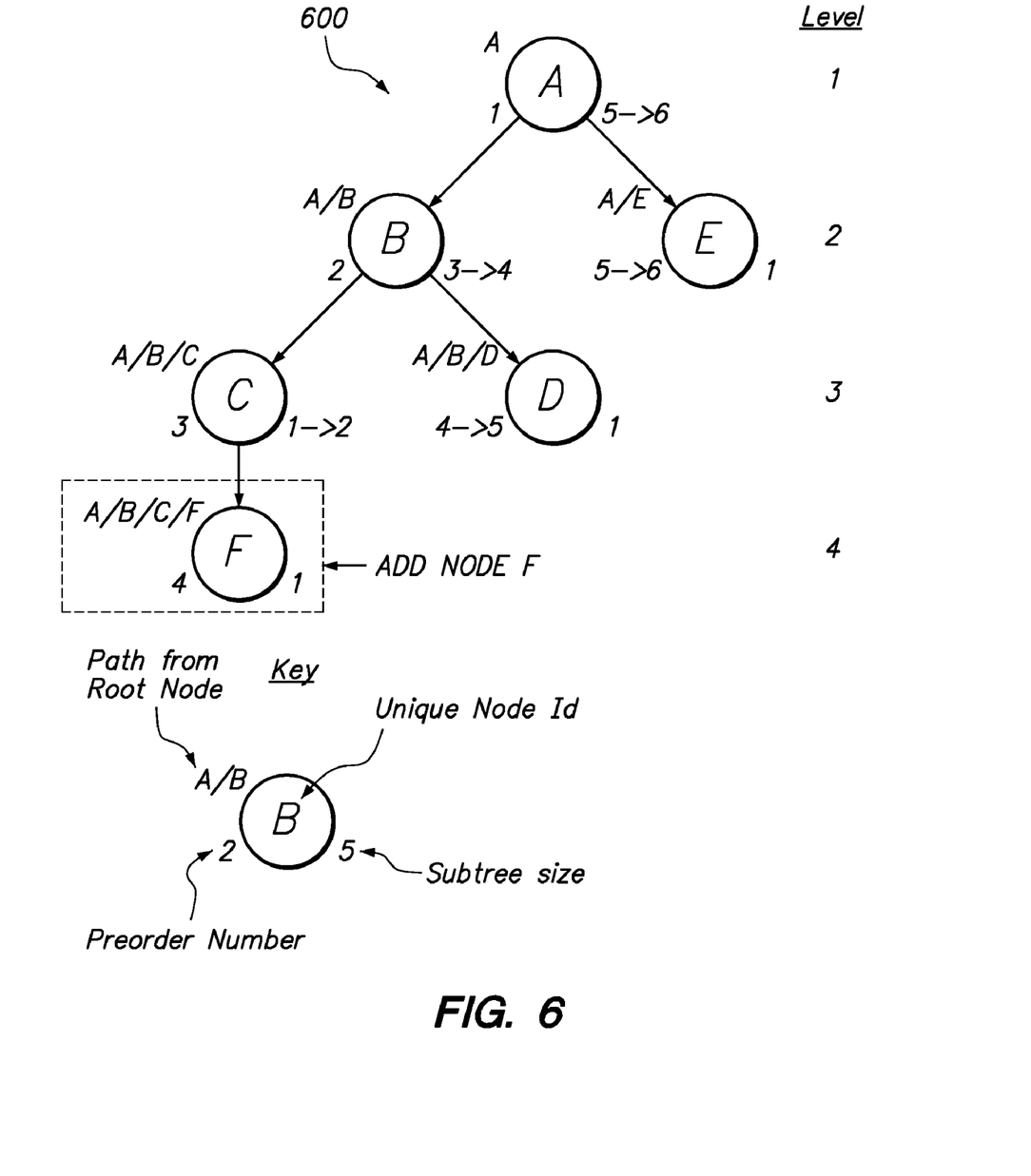
FIG. 6 is a diagram of an exemplary tree that illustrates adding a child node to a parent node according to an embodiment of the invention.

For example, as shown in FIG. 6, child node F has been added to parent node C. FIG. 2 depicts the same tree shown by FIG. 6 prior to adding child node F to parent node C. The path from node C to the root node is node C, node B, and node A. As shown by FIG. 6, the subtree sizes associated with nodes C, B, and A have been incremented by one as compared to the tree depicted in FIG. 2.

When a new child node is added, the subtree size of the newly added child node is assigned a value of one, because the child node is a leaf node which does not have any child nodes of its own. For example, newly added child node F has a subtree size of one as illustrated by FIG. 6. In an embodiment, server 330 may assign a subtree size to the newly added child node by updating subtree size data 390 so that the subtree size associated with the newly added child node has a value of one.

In step 520, the preorder number associated with the child node being added is assigned a number equal to the sum of the preorder number of the parent node of the newly added child node and the subtree size of the parent node of the newly added child node (prior to adding the newly added child node). Server 330 may perform step 520 by updating preorder data 380 so that the preorder number associated with the child node being added is assigned a number equal to the sum of the preorder number and the subtree size of the parent node of the newly added child node. For example, in adding node F to node C as depicted in FIG. 6, the preorder number of newly added node F is assigned a value of 4 because 4 is equal to the sum of the preorder number of the parent node of node F (node C has a preorder number of 3) and the subtree size of node C prior to adding node F as a child node of node C (node C had a subtree size of 1 prior to adding node F as a child node of node C).

In step 530, the preorder number associated with any node having a preorder number greater than or equal to the preorder number associated with the newly added child node is incremented by a value of one. Server 330 may perform step 530 by updating preorder data 380 so that the preorder number associated with any node having a preorder number greater than the preorder number associated with the parent node of the newly added child node is incremented by a value of one.

As an example, FIG. 6 depicts the tree of FIG. 2 after node F has been added as a child node to parent node C. As shown by FIG. 6, the preorder numbers associated with each node having a preorder number greater than the preorder number of node C prior to adding node F as a child node of node C has been incremented by a value of one. Specifically, the preorder number associated with node D was increased from four to five, and the preorder number associated with node E was increased from five to six.

While FIG. 5 depicts the performance of steps 510, 520, and 530 in a certain order, other embodiments of the invention may perform steps 510, 520, and 530 in a different order. Indeed, some embodiments of the invention may perform two or more of steps 510, 520, and 530 in parallel. Thus, embodiments of the invention may perform steps 510, 520, and 530 in any order.

Figure 7:
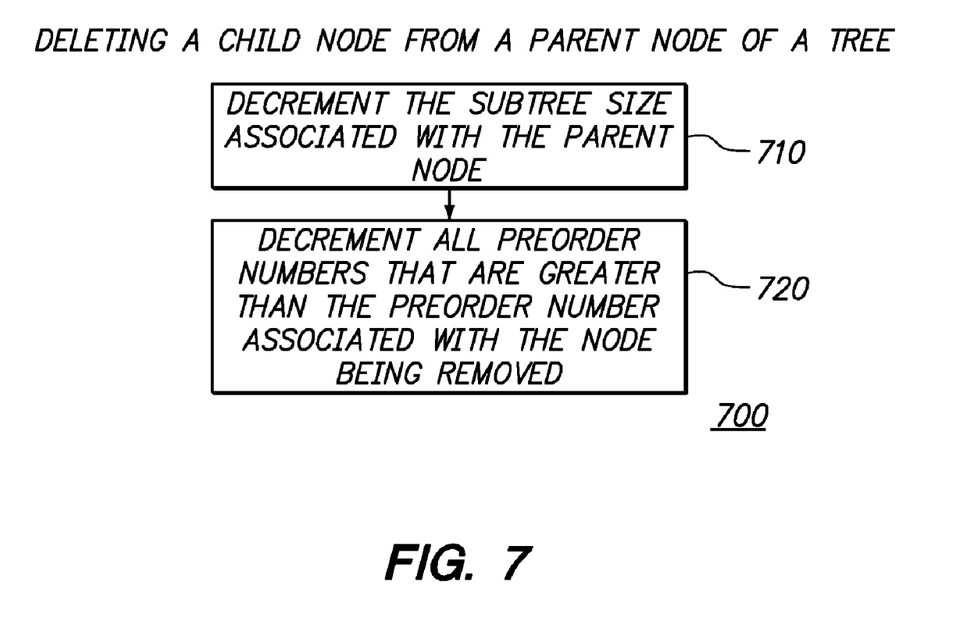
FIG. 7 is a flowchart illustrating the steps of deleting a child node from a parent node of a tree according to an embodiment of the invention.
Figure 8:
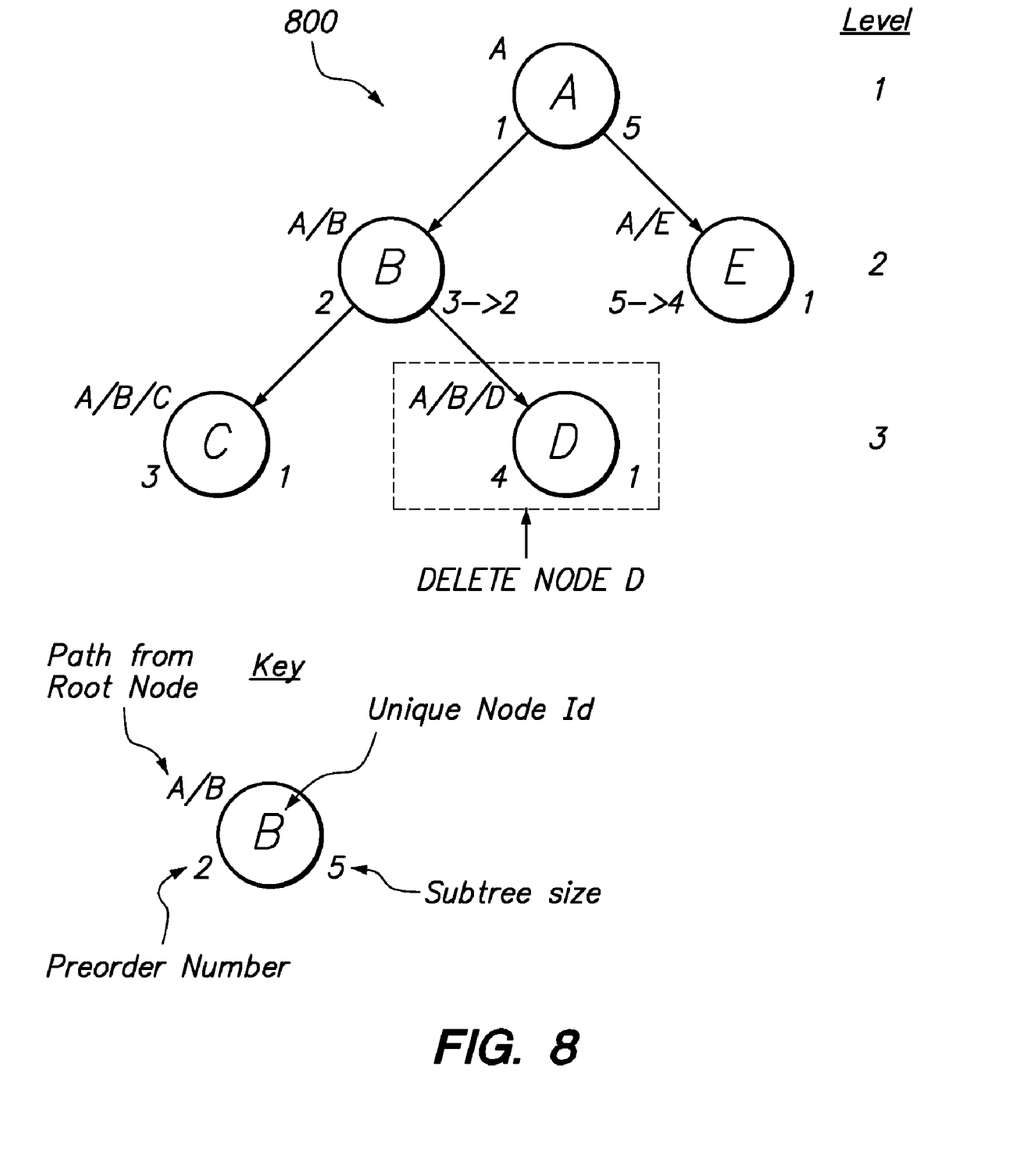
FIG. 8 is a diagram of an exemplary tree that illustrates deleting a child node from a parent node according to an embodiment of the invention.

FIG. 7 is a flowchart illustrating the steps of deleting a child node from a parent node of a tree according to an embodiment of the invention. In an embodiment, the steps of FIG. 7 may be performed by server 330. The steps of FIG. 7 shall be described below with reference to FIG. 8, which is a diagram of an exemplary tree 800 that illustrates deleting a child node D from a parent node B of the tree depicted in FIG. 2 according to an embodiment of the invention.

In step 710, the subtree size associated with the parent node of the newly deleted child node is decremented by a value of one. Server 330 may perform step 710 by updating subtree size data 390 so that the subtree size associated with the parent node of the newly deleted child node is decremented by a value of one. For example, as illustrated by FIG. 7, in the performance of step 710, the subtree size of node B is decremented from a value of three to a value of two to reflect that fact that node D is no longer part of the subtree rooted at node B.

In step 720, all the preorder numbers, of nodes of the tree, which are greater than the preorder number of the node being removed, are decremented by one. Server 330 may perform step 720 by updating preorder data 380 so that all the preorder numbers that are greater than the preorder number of the node being removed are decremented by one. For example, in FIG. 8, node E has a preorder number greater than the preorder number of node D; consequently, the preorder number of node E is decremented from five to four. In this way, all the preorder numbers of the tree may be updated to reflect that the node being removed is no longer part of the tree.

While FIG. 7 depicts the performance of steps 710 and 720 in a certain order, other embodiments of the invention may perform steps 710 and 720 in a different order. Indeed, some embodiments of the invention may perform steps 710 and 720 in parallel. Thus, embodiments of the invention may perform steps 710 and 720 in any order.

Having described how add operations and delete operations may be performed by embodiments of the invention, additional discussion will now be presented for how to optimize the performance of add operations and delete operations according to embodiments of the invention.

Analyzing Edit Operations To Be Performed In A Sequence

The performance of edit operations to a node of a tree may be optimized to increase speed and conserve computational resources. In performing step 410, server 330 maintains a preorder number and a subtree size for each node of a tree while performing edit operations to the tree. As shall be explained below, server 330 may optimize the performance of edit operations by analyzing multiple edit operations in a batch prior to performing the edit operations. An edit operation performed on a node of a tree may either be an add operation to add a child node to a parent node of the tree or a delete operation to delete a child node from a parent node of a tree.

In an embodiment, in step 410, server 330 collects a plurality of edit operations to be performed on a node of a tree in a batch or group. After server 330 collects a configurable number of edit operations or after the expiration of a configurable amount of time, server 330 may arrange the plurality of edit operations in a sequence. The sequence orders the plurality of edit operations based on the preorder number of the node on which each of the plurality of edit operations is to be performed. Note that add operations are performed on a parent node of the child node being added and delete operations are performed on the node being deleted. The sequence of edit operations is maintained in memory at or accessible to server 330.

The first edit operation in the sequence is the edit operation to be performed on the node having the lowest preorder number. Each subsequent edit operation in the sequence is to be performed on a node having a larger preorder number than the preorder number of the node on which the previous edit operation in the sequence is to be performed.

Each of the edit operations in the sequence will be performed by server 330 in the order in which the edit operation appears in the sequence. In performing an edit operation, server 330 (a) updates hierarchical data 370, preorder data 380, and subtree size data 390 as necessary to perform the edit operation, and (b) updates the preorder numbers associated with the edit operations arranged in the sequence stored in memory to reflect any edit operations that have been performed.

In an embodiment, server 330 may examine the sequence of edit operations prior to performing any of the edit operations to ensure that the edit operations in the sequence are performed in an optimal manner. In such an embodiment, server 330 may examine the sequence of edit operations to identify where (a) two or more add operations appear consecutively in the sequence of edit operations or (b) two or more delete operations appear consecutively in the sequence of edit operations. Upon identifying a consecutive sequence of two or more add operations or two or more delete operation in the sequence, server 330 may perform the two or more add operations or two or more delete operation in the sequence using a batch update so that preorder numbers may be updated in a single update operation to reflect multiple edit operations performed to nodes of the tree.

To illustrate, assume that a consecutive sequence of three add operations was identified by server 330 in the sequence of edit operations. After performing the first add operation, server 330 increments, by one, all the preorder numbers of the tree which are (a) greater than the preorder number of the parent node of the child node added by the first add operation but (b) less than or equal to the preorder number of the parent node of the child node added by the second add operation. After performing the second add operation, server 330 increments, by two, all the preorder numbers of the tree which are (a) greater than the preorder number of the parent node of the child node added by the second add operation but (b) less than or equal to the preorder number of the parent node of the child node added by the third add operation. Note that certain preorder numbers are incremented by two, rather than one. In this way, in performing a single update operation, the preorder number of certain nodes may be updated to reflect the performance of two edit operations. After performing the third add operation, server 330 increments, by three, all the preorder numbers of the tree which are greater than the preorder number of the parent node of the child node added by the third add operation. Note that certain preorder numbers are incremented by three, rather than one. In this way, in performing a single update operation, the preorder number of certain nodes may be updated to reflect the performance of multiple edit operations.

Similarly, multiple consecutive delete operations in the sequence of edit operations may be performed in a batch update as well. For example, if there are X number of consecutive delete operations (where X is any integer), then in the performance of the Xth delete operation by server 330 in the X number of consecutive delete operations, all preorder numbers of the tree which are greater than the preorder number of the node being deleted by the Xth operation are decremented by X.

In an embodiment, server 330 may identify a particular edit operation, in the sequence of edit operations, where the number of add operations that appear before the particular edit operation in the sequence of edit operations is equal to the number of delete operations that appear before the particular edit operation in the sequence of edit operations. Consequently, server 330 may determine that the preorder numbers of all the nodes of the tree which (a) are greater than the preorder number of the node on which the edit operation immediately prior to the particular edit operation is performed on and (b) less than or equal to the preorder number of the node on which the particular edit operation is performed need not be updated. This is so because the number of add operations which are performed prior to the particular edit operation is equal to the number of delete operations that are performed prior to the particular edit operation, and as a result, the preorder numbers are not changed as a result of performing those add and delete operations.

Embodiments of the invention advantageously employ a system where preorder numbers may be accurately maintained in a manner that allows for edit operations to be performed on a tree in a fast and efficient manner while minimizing the consumption of resources. By maintaining accurate preorder numbers, systems according to embodiments of the invention may perform paging operations on trees in an approach that uses less memory than prior approaches and reduces the latency visible to the end user. Moreover, by batching edit operations and analyzing the edit operations to trees prior to their performance, preorder numbers of certain nodes may be updated to reflect the performance of multiple edit operations in a single update operation, thereby further improving performance and minimizing the consumption of resources.

Implementing Mechanisms

Figure 9:
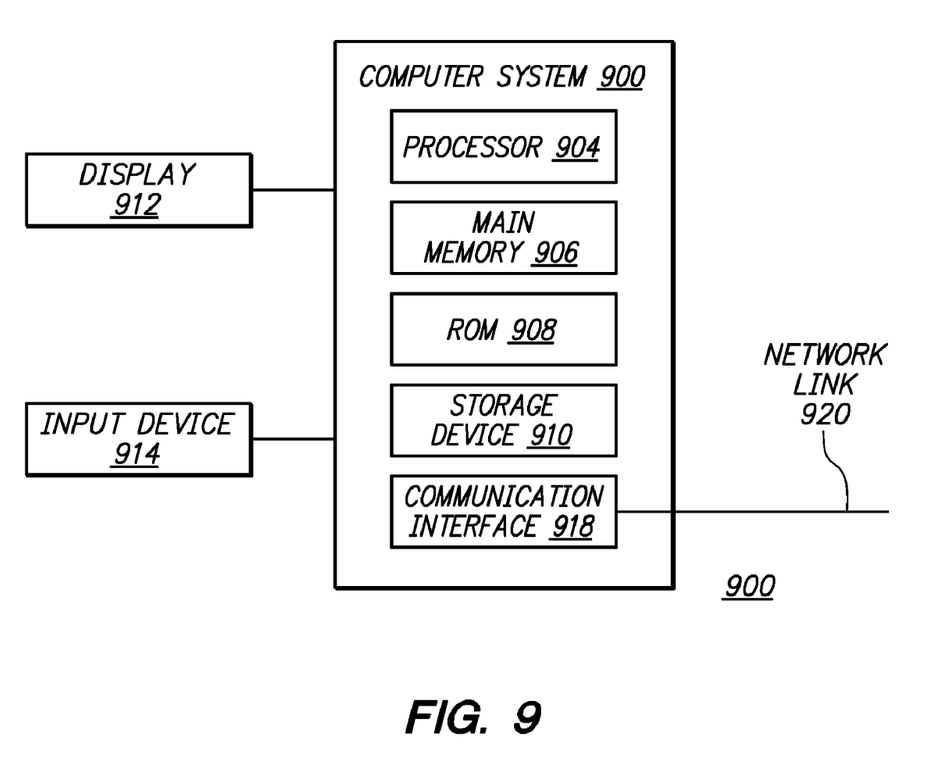
FIG. 9 is a block diagram that illustrates a computer system upon which an embodiment of the invention may be implemented.

In an embodiment, client 320, server 330, and storage medium 340 may each be implemented using a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, a light pen, a touch screen, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for performing operations, the method comprising:

storing, in a non-transitory machine-readable medium, for each node of a plurality of nodes of a tree, a preorder number identifying a position of said each node in a depth-first search ordering of said plurality of nodes that starts at a root node of said tree and explores an unexplored child before backtracking;

storing, in said non-transitory machine-readable medium, for said each node a count of all the nodes of a subtree rooted at said each node, said subtree comprising said each node; and in response to receiving a request to perform an edit operation to delete an existing node from said plurality of nodes or to add a new node to said plurality of nodes of said tree, at least one processor changing the preorder number stored for at least one node in said plurality of nodes of said tree and changing the count stored for at least another node in said plurality of nodes of said tree;

wherein said edit operation is comprised in a plurality of edit operations, said plurality of edit operations comprise one or more add operations and one or more delete operations;

performing said plurality of edit operations, by said at least one processor determining said each node should not have said preorder number changed because the number of said one or more add operations that have been performed or will be performed on a subset of nodes in said plurality of nodes is equal to the number of said one or more delete operations that have been performed or will be performed on said subset of nodes, wherein the preorder number of said each node is greater than another preorder number of another node in said subset of nodes; and performing another operation that identifies a particular page number of a page to be displayed among a plurality of pages, wherein said another operation comprises identifying which nodes of said plurality of nodes have the preorder number of a value ranging from $p*(n-1)+1$ to $p*(n-1)+p$, wherein n represents said particular page number, and wherein p represents a page size.

2. The machine-implemented method of claim 1, wherein said maintaining comprises:

upon performing an add operation that adds a child node to a parent node of said tree, incrementing the count associated with said parent node.

3. The machine-implemented method of claim 1 wherein said edit operation comprises an add operation that adds said new node as a child node to said at least another node in said tree, and said method further comprises calculating as a new preorder number associated with said new node, a number equal to a sum of the preorder number stored for said at least another node and the count stored for said at least another node.

4. The machine-implemented method of claim 1 wherein said edit operation comprises a delete operation that removes the existing node from said at least another node in said tree, and said changing the count comprises decrementing the count stored for said at least another node.

5. The machine-implemented method of claim 1 wherein said edit operation comprises a delete operation that removes the existing node from said at least another node in said tree, and said changing the preorder number comprises decrementing all preorder numbers, associated with nodes of said tree, that are greater than the preorder number associated with the existing node being removed in the delete operation.

6. The machine-implemented method of claim 1 further comprising:

arranging the plurality of edit operations including said edit operation in a sequence, wherein each of said plurality of edit operations is to be performed on one of a set of nodes of said tree, and wherein said sequence orders said plurality of edit operations based on the preorder number of the node on which each of said plurality of edit operations is to be performed; and wherein said plurality of edit operations are performed in order of said sequence.

7. The machine-implemented method of claim 1 wherein said performing said plurality of edit operations comprises:

updating, in a single update operation that comprises said changings, the preorder number of said at least one node to reflect performance of two or more of said plurality of edit operations.

8. The machine-implemented method of claim 1 wherein said plurality of nodes are to be displayed in association with the plurality of pages, and wherein said method further comprises:

determining a total number of pages upon which said plurality of nodes should be displayed by dividing the count of a root node of said tree by the number of said plurality of nodes of said tree to be displayed on each of said plurality of pages.

9. The method of claim 1 further comprising:

storing, in said non-transitory machine-readable medium, in addition to said preorder number and said count, a level number for each node indicating how far away said each node is from said root node.

10. One or more non-transitory machine-readable media comprising one or more sequences of instructions for performing operations, which when executed by at least one processor, cause said at least one processor to perform:

storing, for each node of a plurality of nodes of a tree, a preorder number identifying a position of said each node in a depth-first search ordering of said plurality of nodes that starts at a root node of said tree and explores an unexplored child before backtracking;

storing, in said non-transitory machine-readable medium, for said each node a count of all the nodes of a subtree rooted at said each node, said subtree comprising said each node; and in response to receiving a request to perform an edit operation to delete an existing node from said plurality of nodes or to add a new node to said plurality of nodes of said tree, changing the preorder number stored for at least one node in said plurality of nodes of said tree and changing the count stored for at least another node in said plurality of nodes of said tree;

wherein said edit operation is comprised in a plurality of edit operations, said plurality of edit operations comprise one or more add operations and one or more delete operations;

performing said plurality of edit operations, by said at least one processor determining said each node should not have said preorder number changed because the number of said one or more add operations that have been performed or will be performed on a subset of nodes in said plurality of nodes is equal to the number of said one or more delete operations that have been performed or will be performed on said subset of nodes, wherein the preorder number of said each node is greater than another preorder number of another node in said subset of nodes; and performing another operation that identifies a particular page number of a page to be displayed among a plurality of pages, wherein said another operation comprises identifying which nodes of said plurality of nodes have the preorder number of a value ranging from p*(n−1)+1 to p*(n−1)+p, wherein n represents said particular page number, and wherein p represents a page size.

11. The one or more non-transitory machine-readable media of claim 10, comprising instructions to cause said at least one processor to:

upon performing an add operation that adds a child node to a parent node of said tree, increment the count associated with said parent node.

12. The one or more non-transitory machine-readable media of claim 10 wherein said edit operation comprises an add operation that adds said new node to said at least another node in said tree, and said one or more non-transitory machine-readable media further comprises instructions to calculate as a new preorder number associated with said new node, a number equal to a sum of the preorder number stored for said at least another node and the count stored for said at least another node.

13. The one or more non-transitory machine-readable media of claim 10 wherein said edit operation comprises a delete operation that removes the existing node from said at least another node in said tree, and said changing the count comprises decrementing the count stored for said at least another node.

14. The one or more non-transitory machine-readable media of claim 10 wherein said edit operation comprises a delete operation that removes the existing node from said at least another node in said tree, and said changing the preorder number comprises decrementing all preorder numbers, associated with nodes of said tree, that are greater than the preorder number associated with the existing node being removed in the delete operation.

15. The one or more non-transitory machine-readable media of claim 10 further comprising instructions to cause said at least one processor to:

arrange the plurality of edit operations including said edit operation in a sequence, wherein each said plurality of edit operations is to be performed on one of a set of nodes of said tree, and wherein said sequence orders said plurality of edit operations based on the preorder number of the node on which each of said plurality of edit operations is to be performed; and wherein said plurality of edit operations are performed in order of said sequence.

16. The one or more non-transitory machine-readable media of claim 10 wherein said performing said plurality of edit operations comprises:

updating, in a single update operation that comprises said changings, the preorder number of said at least one node to reflect performance of two or more of said plurality of edit operations.

17. The one or more non-transitory machine-readable media of claim 10, wherein said plurality of nodes are to be displayed in association with the plurality of pages, and wherein said one or more non-transitory machine-readable media further comprise instructions to cause said at least one processor to:

determine a total number of pages upon which said plurality of nodes should be displayed by dividing the count of a root node of said tree by the number of said plurality of nodes of said tree to be displayed on each of said plurality of pages.

18. The one or more non-transitory machine-readable media of claim 10 further comprising instructions to perform:

storing, in addition to said preorder number and said count, a level number for each node indicating how far away said each node is from said root node.

19. A system for performing operations, the system comprising at least one processor and a non-transitory machine-readable media storing instructions to be executed by the at least one processor, the system comprising:

means for storing, in said non-transitory machine-readable medium, for each node of a plurality of nodes of a tree, a preorder number identifying a position of said each node in a depth-first search ordering of said plurality of nodes that starts at a root node of said tree and explores an unexplored child before backtracking;

means for storing, in said non-transitory machine-readable medium, for said each node a count of all the nodes of a subtree rooted at said each node, said subtree comprising said each node; and means, responsive to receipt of a request to perform an edit operation to delete an existing node from said plurality of nodes or to add a new node to said plurality of nodes of said tree, for changing the preorder number stored for at least one node in said plurality of nodes of said tree and changing the count stored for at least another node in said plurality of nodes of said tree;

wherein said edit operation is comprised in a plurality of edit operations, said plurality of edit operations comprise one or more add operations and one or more delete operations;

means for performing said plurality of edit operations, by said at least one processor determining said each node should not have said preorder number changed because the number of said one or more add operations that have been performed or will be performed on a subset of nodes in said plurality of nodes is equal to the number of said one or more delete operations that have been performed or will be performed on said subset of nodes, wherein the preorder number of said each node is greater than another preorder number of another node in said subset of nodes; and means for performing another operation that identifies a particular page number of a page to be displayed among a plurality of pages, wherein said another operation comprises identifying which nodes of said plurality of nodes have the preorder number of a value ranging from p*(n−1)+1 to p*(n−1)+p, wherein n represents said particular page number, and wherein p represents a page size.

20. The system of claim 19 further comprising:

means for storing, in said non-transitory machine-readable medium, in addition to said preorder number and said count, a level number for each node indicating how far away said each node is from said root node.

* * * * *

UNITED STATES PATENT AND TRADEMARK OFFICE
CERTIFICATE OF CORRECTION

| | | |
|---|---|---|
| PATENT NO. | : 8,209,353 B2 | |
| APPLICATION NO. | : 12/415440 | |
| DATED | : June 26, 2012 | |
| INVENTOR(S) | : Krishnamurthy | |

It is certified that error appears in the above-identified patent and that said Letters Patent is hereby corrected as shown below:

In column 15, line 51-52, in Claim 2, delete "maintaining comprises: upon performing" and insert -- edit operation comprises --, therefor.

In column 15, line 52, in Claim 2, after "that adds" insert -- said new node as --.

In column 15, line 52-53, in Claim 2, delete "to a parent node of" and insert -- to said at least another node in --, therefor.

In column 15, line 53, in Claim 2, after "said tree," insert -- and said changing the count comprises --.

In column 15, line 53-54, in Claim 2, delete "associated with" and insert -- stored for --, therefor.

In column 15, line 54, in Claim 2, delete "parent" and insert -- at least another --, therefor.

In column 16, line 34, in Claim 9, delete "method" and insert -- machine-implemented method --, therefor.

In column 17, line 15-17, in Claim 11, delete "comprising instructions to cause said at least one processor to: upon performing" and insert -- wherein said edit operation comprises --, therefor.

In column 17, line 17, in Claim 11, after "that adds" insert -- said new node as --.

In column 17, line 17-18, in Claim 11, delete "to a parent node of" and insert -- to said at least another node in --, therefor.

In column 17, line 18, in Claim 11, delete "increment" insert -- and said changing the count comprises incrementing --.

Signed and Sealed this
Sixteenth Day of October, 2012

David J. Kappos
*Director of the United States Patent and Trademark Office*

CERTIFICATE OF CORRECTION (continued)
U.S. Pat. No. 8,209,353 B2

In column 17, line 18-19, in Claim 11, delete "associated with" and insert -- stored for --, therefor.

In column 17, line 19, in Claim 11, delete "parent" and insert -- at least another --, therefor.